(12) United States Patent
Kaneko et al.

(10) Patent No.: US 6,438,307 B1
(45) Date of Patent: Aug. 20, 2002

(54) OPTICAL WAVEGUIDE AND PROCESS FOR PRODUCING SAME

(75) Inventors: Katsuhiro Kaneko; Shigeo Tanahashi, both of Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/536,109

(22) Filed: Mar. 24, 2000

(30) Foreign Application Priority Data

Mar. 25, 1999 (JP) ............................................. 11-080697

(51) Int. Cl.[7] ................................................. G02B 6/10
(52) U.S. Cl. ........................................ 385/131; 385/129
(58) Field of Search .................................. 385/129–131

(56) References Cited

U.S. PATENT DOCUMENTS

| 5,142,605 A | * | 8/1992 | Diemeer et al. ............. 385/130 |
| 5,672,672 A | | 9/1997 | Amano et al. |
| 5,764,820 A | * | 6/1998 | De Dobbelaere et al. ..... 385/14 |
| 5,949,943 A | * | 11/1999 | Watanabe et al. ........... 385/119 |

FOREIGN PATENT DOCUMENTS

| JP | 63-91604 | 4/1988 |
| JP | 1-219803 | 9/1989 |
| JP | 6-172533 | 6/1994 |

* cited by examiner

Primary Examiner—John D. Lee
Assistant Examiner—Jerry T. Rahll
(74) Attorney, Agent, or Firm—Hogan & Hartson, L.L.P.

(57) ABSTRACT

An optical waveguide is provided, which comprises a core part formed of optical material whose refractive index is varied corresponding to the irradiation amount of light having energy higher than that of light to be transmitted, and a cladding part formed of the optical material, but having a smaller refractive index than that of the core part by irradiation with the light having higher energy, which covers at least part of an outer periphery of the core part in the direction of the transmission of light. The optical waveguide is produced by a production process comprising a step of forming a layer of the optical material whose refractive index is varied corresponding to the irradiation amount of light having higher energy on a substrate, and a step of irradiating region is to be a core part and a cladding part, with different irradiation amounts of light, to form the core part and the cladding part having a smaller refractive index than that of the core part, which covers at least part of the outer periphery of the core part in the direction of transmission of light. The optical waveguide can be produced by the easy process with high productivity and high processing accuracy.

8 Claims, 3 Drawing Sheets

IRRADIATION WITH LIGHT

OPTICAL WAVEGUIDE AND PROCESS FOR PRODUCING SAME

BACKGROUND OF THE INVENTION

1. Field of the Invention

The present invention relates to an optical waveguide for use in optical communication modules, and a process for producing the same. More particularly, it relates to a three-dimensionally shaped optical waveguide which can be produced by irradiating optical material with light and controlling the refractive index of the optical material, and a process for producing the same.

2. Description of the Related Art

Hitherto, as for optical waveguides which are used to transmit an optical signal in an optical communication module are known a silica-based optical waveguide comprising a cladding part and a core part which are three-dimensionally shaped and formed of silica films which are formed on a quartz glass substrate or silicon substrate by a flame accumulation method, and an optical waveguide comprising a single crystal substrate of lithium niobate as a cladding part, and a core part which is three-dimensionally shaped by thermal diffusion of titanium (Ti) onto the substrate.

However, with respect to the conventional optical waveguides, it is difficult to produce a desired optical waveguide on various kinds of substrates because heat treatment at a high temperature of 1,000° C. or more is necessary in the course of the production process thereof. From a standpoint of convenience of production of optical waveguides, instead of the conventional optical waveguides which require such high temperature treatment on production, organic optical waveguides using organic optical material, which can be formed at low temperature, has been studied. The use of organic optical material such as PMMA (polymethyl methacrylate), polycarbonate, polyimide, polysiloxane and BCB (benzocyclobutene) has been studied to produce organic optical waveguides.

The organic optical waveguide is generally produced with the use of organic optical material in such a manner that a lower cladding layer is formed on a silicon or glass substrate, a core layer having a refractive index higher than that of the cladding part is formed, and the core layer is processed by a thin film fine working technique utilizing a dry etching method, such as reactive ion etching (RIE), or a wet etching method using an etchant, to form a core pert, which is thereafter covered with an upper cladding part having a refractive index lower than that of the core part, so as to form a three-dimensionally shaped optical waveguide comprising the cladding part and the core part built therein.

Japanese Unexamined Patent Publication JP-A 6-172533 (1994) proposes a process for producing a polysiloxane series optical waveguide comprising a step of forming a lower cladding layer on a substrate, a step of forming a core part and a step of forming an upper cladding layer, in which the formation of the tote part is conducted by a step of insolubilization of a polymer by irradiation with far ultraviolet rays or an electron beam and a step of removing unnecessary parts.

In the case where the core part is formed by the dry etching on the production of an optical waveguide as mentioned above, complicated and sophisticated processes and their control are necessary when producing a mask pattern and the dry etching method itself needs such processes and their control, and thus there is a problem that a desired optical waveguide cannot be easily obtained. Furthermore, because the processes takes much time and the etching rate of the dry etching is low, there is another problem that a long period of time is required for producing the optical waveguide.

In the case of utilizing the wet etching method as mentioned above, precise control of the processed shape of the core part is difficult because the etching proceeds in an isotropic manner, and thus there is a problem that it is difficult to produce optical waveguides of which processing accuracies of the order of sub-microns are demanded, and functional optical circuits using such an optical waveguide.

In the case of employing the insolubilization step of irradiating a polymer with far ultraviolet rays or an electron beam and the step of removing unnecessary parts as proposed in JP-A 6-172533, the processed shape of the core part can be precisely controlled in comparison with the wet etching using an etchant, and the process becomes convenient in comparison with the case using the dry etching. However, it involves problems that the process is still complicated since the step of removing unnecessary parts is required, and side walls of the core part is roughened in removing unnecessary parts, which causes scattering loss of light.

When a core part of a convex shape is formed, which is then covered with a cladding part as described in the publication, since asperities are formed on the surface of the cladding part, there is a problem that when optical waveguides are accumulated in the vertical direction, the processing accuracy of a core part of an optical waveguide formed by the later step is deteriorated due to the unevenness of the optical waveguide formed by the former step. Therefore, it brings about a problem that loss of light occurs when the light is transmitted through the optical waveguide formed by the later step with low processing accuracy.

SUMMARY OF THE INVENTION

The invention has been developed in view of the problems associated with the conventional technologies. An object of the invention is to provide an optical waveguide capable of being produced by an easy process with high productivity and processing accuracy, and a process for producing the same.

The invention provides an optical waveguide comprising:

a core part formed of optical material whose refractive index varies corresponding to an irradiation amount of light having energy higher than that of light to be transmitted; and a cladding part disposed so as to cover at least part of an outer periphery of the core part in a direction of transmission of light, the cladding part being formed of optical material which is the same material as the core part before irradiation with light, and has a refractive index lower than that of the core part.

According to the invention, the core part and cladding part of the optical waveguide are composed of a layer containing optical material whose refractive index varies corresponding to the irradiation amount of light having energy higher than that of the light to be transmitted. The core part and cladding part are formed by lowering the refractive index of the cladding part in comparison with that of the core part by irradiating the region to be the cladding part with a different amount of light from that of the region to be the core part, so as to provide an optical waveguide comprising the cladding part covering at least part of the outer periphery of the core part in the direction of transmission of light. That is, it is not necessary to use dry etching or wet etching in formation of the core part, and thus the complicated steps and the deterioration of the processed shape associated with the working of the core part using dry etching and wet etching can be eliminated, to provide an optical waveguide produced by an easy process with high productivity and high processing accuracy.

In the optical waveguide of the invention, it is preferable that the optical material of the core part and cladding part has such characteristics that the refractive index decreases with increases in irradiation amount of the light having higher energy within a predetermined range of irradiation amount of light.

The optical waveguide of the invention is characterized in that the core part formed of optical material whose refractive index decreases with increases in irradiation amount of the light having higher energy than that of the guided light, within a predetermined range, is housed in the cladding part formed of the same optical material, having a refractive index smaller than that of the core part by increasing the irradiation amount of the light.

According to the invention, a layer of optical material whose refractive index varies corresponding to the irradiation amount of the light having energy higher than that of the guided light to be transmitted in the core part of the optical waveguide and decreases with increases in irradiation amount of the light within the predetermined range is used in the core part and cladding part of the optical waveguide, and the core part and cladding part are formed by irradiating the region to be the cladding part with a larger amount of the light than that of the region to be the core part, to make the refractive index of the cladding part smaller than that of the core part, so as to provide an optical waveguide comprising the cladding part covering at least part of the outer periphery of the core part in a direction of transmission of light. That is, it is not necessary to use dry etching and wet etching on forming the core part, and thus the complicated steps and the deterioration of the processed shape associated with the working of the core part using dry etching and wet etching can be eliminated, so as to provide an optical waveguide produced by an easy process with high productivity and high processing accuracy.

In the optical waveguide of the invention, it is preferable that the optical material is a material which is converted to a siloxane polymer having siloxane bonds by irradiating the optical material with the light having higher energy.

The optical waveguide of the invention is characterized in that the optical material is a siloxane polymer in which siloxane bonds are formed by the irradiation with light.

According to the invention, the siloxane polymer having a clear relationship, in which the refractive index decreases with increases in irradiation amount of light within the predetermined range of irradiation amount of light, is used, so as to conveniently provide an optical waveguide having a core part and a cladding part which are formed with a desired refractive index.

In the optical waveguide of the invention, it is preferable that a lower limit of the predetermined range of irradiation amount of light is equal to or more than such an irradiation amount that the refractive index of the optical material becomes the maximum with respect to the irradiation with the light having higher energy.

According to the invention, sufficient siloxane bonds are formed in the optical material irradiated with a sufficient irradiation amount of light, to form the optical material wish a firm and stable siloxane polymer, and thus the core part and cladding part having the desired refractive indexes with good weather resistance and heat stability can be formed, In the optical waveguide of the invention, it is preferable that the light having higher energy is an ultraviolet ray.

According to the invention, since the ultraviolet ray has an effective energy component to a polymerization promoter, the siloxane bonds are formed under good conditions, and an optical waveguide can be provided which is conveniently produced by easily obtaining the desired variation of refractive index.

The invention also provides an optical waveguide comprising;

a substrate;

a first cladding part disposed on one surface of the substrate:

a core part disposed on part of a surface of the first cladding part, opposite to the substrate, the core part being formed of optical material whose refractive index varies corresponding to an irradiation amount of light having energy higher than that of light to be transmitted, and having a refractive index higher than that of the first cladding part;

second cladding parts disposed on remaining part of the surface of the first cladding part, being adjacent to the core part at both aides thereof along a direction of transmission of light, the second cladding parts being formed of the same optical material before irradiation with light, and having a refractive index lower than that of the core part; and a third cladding part disposed on surfaces of the core part and second cladding parts, opposite to the first cladding part, the third cladding part having a refractive index lower than that of the core part.

According to the invention, even when a plurality of optical waveguides are accumulated in the vertical direction, no asperity is formed on the surface of the respective optical waveguide. Therefore, such problems can be eliminated that the processing accuracy of the optical waveguide formed in the later step is deteriorated due to the unevenness of the optical waveguide formed in the former step, and loss of light occurs in transmitting light in the optical waveguide formed in the later step due to the unevenness.

In the optical waveguide of the invention it is preferable that the first and third cladding parts are formed of optical material whose refractive index varies corresponding to the irradiation amount of the light having higher energy.

According to the invention, since the first and third cladding parts comprise the optical material whose refractive index varies corresponding to the irradiation amount of the light having higher energy, an optical waveguide formed with a desired refractive index can be conveniently provided.

The invention further provides a process for producing an optical waveguide comprising:

a step of forming a layer of optical material whose refractive index varies corresponding to the irradiation amount of light having energy higher than that of light to be transmitted; and a step of irradiating a region to be a core part and a region to be a cladding part covering at least part of an outer periphery of the core part in a direction of transmission of light, with the light having higher energy in different irradiation amounts, respectively, so as to provide a core part and a cladding part having a refractive index lower than a refractive index of the core part.

According to the invention, the layer comprising optical material whose refractive index varies corresponding to the irradiation amount of light having energy higher than that of the guided light is formed on the substrate, to constitute the core part and cladding part of the optical waveguide. By irradiating a region of the layer to be the cladding part, with light in an irradiation amount different from that for a region of the layer to be the core part, specifically with a relatively large amount of light, to make the refractive index of the cladding part lower than that of the core part, the core part and the cladding part covering at least part of the outer periphery of the core part are formed so as to produce the optical waveguide. That is, dry etching or wet etching is not required on formation of the core part, and the complicated steps and the deterioration of the processed shape associated with the working of the core part using dry etching and wet etching can be eliminated, to produce an optical waveguide by an easy process with high productivity and high processing accuracy.

The process for producing an optical waveguide of the invention is characterized by comprising a step of forming a layer of optical material whose refractive index decreases corresponding to the irradiation amount of light having energy higher than that of the guided light within a predetermined range of irradiation amount of lights and a step of irradiating a periphery of a region of the layer to be a core part, with the light in a relatively large irradiation amount to form the core part and the cladding part having a refractive index lower than that of the core part and housing the core part.

In the process for producing an optical waveguide of the invention, it is preferable that in the step of forming the layer, optical material having such characteristics that a refractive index thereof decreases with increases in irradiation amount of the light having higher energy within a predetermined range of irradiation amount of light is used as the optical material, and in the step of forming the core part and the cladding part, the region to be the cladding is irradiated with the light having higher energy in an irradiation amount relatively larger than that for the region to be the core part within the predetermined range of irradiation amount of light, to make the refractive index of the cladding lower than that of the core part.

The process for producing an optical waveguide of the invention is characterized by comprising a step of forming a layer of optical material whose refractive index decreases corresponding to the irradiation amount of light having energy higher than that of the guided light within the predetermined range of irradiation amount of light, and a step of irradiating a periphery of a region of the layer to be a core part with the light in a relatively large irradiation amount to form the core part and the cladding part having a refractive index lower than that of the core part and housing the core part.

According to the invention, the layer of optical material whose refractive index varies corresponding to the irradiation amount of light having energy higher than that of the guided light and decreases with increases in irradiation amount of light within the predetermined range is formed on a substrate, and by using the layer as the core part and cladding part of the optical waveguide, the core part and the cladding part covering at least part of the outer periphery of the core part in the direction of transmission of light are formed by irradiating the peripheral region of the core part, i.e., the region to be the cladding part, with light in an irradiation amount relatively larger than the region to be the core part, to make the refractive index of the cladding part smaller than that of the core part, so as to produce the optical waveguide. That is, it is not necessary to use of dry etching and wet etching in formation of the core part, and thus the complicated steps and deterioration of the processed shape associated with the working of the core part using dry etching and wet etching can be eliminated, so as to provide an optical waveguide produced by an easy process with high productivity and high processing accuracy.

In the process for producing an optical waveguide of the invention, it is preferable that in the step of forming the layer, the optical material is a material which is converted to a siloxane polymer having siloxane bonds by irradiation with the light having higher energy.

In the production process described above, the process for producing an optical waveguide of the invention is characterized in that the optical material is a siloxane polymer in which siloxane bonds are formed the irradiation with light According to the invention, the siloxane polymer having a clear relationship, in which the refractive index decreases with increases in irradiation amount of light within the predetermined range of irradiation amount of light, is used, so as to conveniently provide an optical waveguide having a core part and a cladding part with a desired refractive index.

In the process for producing an optical waveguide of the invention, it is preferable that in the step of forming the layer, a lower limit of the predetermined range of irradiation amount of light is equal to or higher than such an irradiation amount that the refractive index of the optical material becomes the maximum with respect to the irradiation with the light having higher energy.

According to the invention, sufficient siloxane bonds are formed in the optical material irradiated with a sufficient irradiation amount of light, to form the optical material with a firm and stable siloxane polymer, so that the layer having the desired refractive indexes can be formed, and an optical waveguide having good weather resistance and heat stability can also be produced.

In the process for producing an optical waveguide of the invention, it is preferable that the siloxane bonds are formed by irradiation with an ultraviolet ray.

According to the invention, because the siloxane bonds can be formed in good conditions by irradiation with an ultraviolet ray having an effective energy component to a polymerization promoter of siloxane bonds, the desired variation in refractive index can be conveniently obtained, and the optical waveguide can be conveniently produced.

BRIEF DESCRIPTION OF THE DRAWINGS

Other and further objects, features, and advantages of the invention will be more explicit from the following detailed description taken with reference to the drawings wherein:

FIGS. 1A to 1C are cross sectional views showing steps of one embodiment of the process for producing an optical waveguide of the invention, in which FIG. 1A is a cross sectional view showing the step of forming a lower cladding layer and an intermediate layer on a substrate, FIG. 1B is a cross sectional view showing the step of forming a core part and a cladding part in the intermediate layer, and FIG. 1C is a cross sectional view showing the step of forming an upper cladding layer, as well as one embodiment of the optical waveguide of the invention;

FIGS. 2A to 2D are cross sectional views showing steps of another embodiment of the process for producing an optical waveguide of the invention, in which FIG. 2A is a cross sectional view showing the step of forming a lower cladding layer on a substrate, FIG. 2B is a cross sectional view showing the step of forming An intermediate layer, FIG. 2C is a cross sectional view showing the step of forming a core part and a cladding part in the intermediate layers and FIG. 2D is a cross sectional view showing the step of forming an upper cladding layer, as well as another embodiment of the optical waveguide of the invention.

DETAILED DESCRIPTION OF THE PREFERRED EMBODIMENTS

Figure 1A:
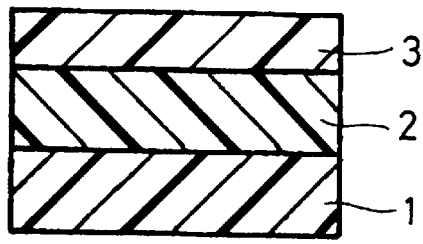

Now referring to the drawings, preferred embodiments of the invention are described below.

The optical waveguide and the process for producing the same according to the invention will be described below with reference to the drawings.

Figure 1B:
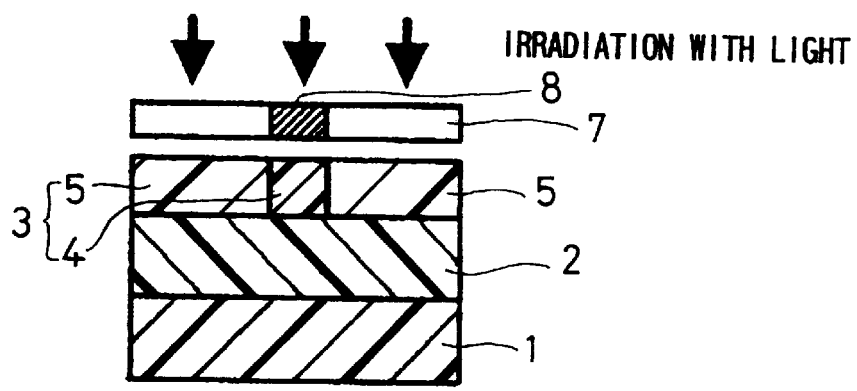
Figure 1C:
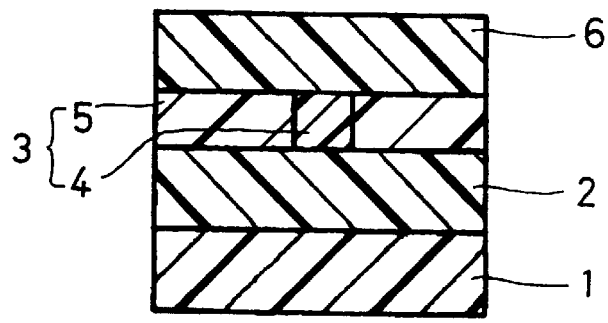

FIGS. 1A to 1C are cross sectional views showing steps of one embodiment of the process for producing an optical waveguide of the invention. FIG. 1A is a cross sectional view showing the step of forming a lower cladding layer and an intermediate layer on a substrate. FIG. 1B is a cross sectional view showing the step of forming a core part and cladding parts in the intermediate layer. FIG. 1C is a cross sectional view showing the step of forming an upper cladding layer, as well as one embodiment of the optical waveguide of the invention. In FIGS. 1A to 1C, an optical waveguide comprises a substrate 1, a lower cladding layer 2, and an intermediate layer 3 in which a core part and cladding parts are formed. The intermediate layer 3 comprises optical material whose refractive index varies corresponding to the irradiation amount of light having energy higher than that of the guided light and decreases within a predetermined range of irradiation amount of light. A core part 4 is formed in the intermediate layer 3, and cladding parts 5 are formed by irradiating regions on both sides of the region to be the core part 4, with the light having energy higher than that of the guided light in an irradiation amount relatively larger than that for the region to be the core part 4, so as to make the refractive index smaller than that of the core part. A cladding portion of the optical waveguide is constituted by the lower cladding layer 2, the cladding parts 5 formed in the intermediate layer 3, and an upper cladding layer 6. The direction of transmitting the guided light is perpendicular to the paper, and the constitutional members 1 to 6 have elongated shapes in the direction perpendicular to the paper.

In the process for producing an optical waveguide, as one embodiment of the invention, a lower cladding layer 2 is formed on a substrate 1 as shown in FIG. 1A.

As the substrate 1, various substrates which are used as a substrate handling an optical signal, such as an optical integrated circuit substrate and an optical and electronic mixed substrate, a silicon substrate, an alumina substrate, a glass ceramics substrate, a multi-layer ceramics substrate, a plastic electric wiring substrate and a polyimide substrate may be used.

On the substrate 1 is formed a layer containing, for example, the same optical material as an intermediate layer 3, i.e., optical material whose refractive index varies corresponding to the irradiation amount of light having energy higher than that of the guided light and decreases with increases in irradiation amount of the light having higher energy within a predetermined range of irradiation amount of light. The layer thus formed is irradiated with light in such an irradiation amount that the refractive index thereof is made smaller than that of a core part 4 formed later in the formed layer, so as to form a lower cladding layer 2.

The lower cladding layer 2 has a refractive index smaller than that of the core part 4, and may ha formed of other material than the optical material.

As shown in FIG. 1A, the intermediate layer 3 for forming the core part 4 and cladding parts 5 of the optical waveguide is formed on the lower cladding layer 2. The intermediate layer 3 comprises optical material whose refractive index varies corresponding to the irradiation amount of light having energy higher than that of the guided light and decreases with increases in irradiation amount of the light having higher energy within a predetermined range of irradiation amount of light.

As shown in FIG. 11, for example, by irradiating only regions to be the cladding part 5 with a predetermined amount of light, the refractive index of the cladding parts 5 becomes smaller than that of the core part 4, to form the core part 4 and the cladding parts 5.

In order to irradiate only the regions to be the cladding part 5 with the predetermined amount of light, for example, the irradiation with light is conducted through a photomask 7 having a shielding part 8 used in the known photolithography process, or the irradiation with light is conducted after shielding the region to be the core part 4 by forming an opening pattern comprising a metallic thin film formed directly on the intermediate layer 3. In the photomask, light-transmitting parts or notches are selectively formed on a plate of a metallic material to form light-transmitting regions with the remaining parts not transmitting light. Alternatively, the irradiation with light is directly conducted only on the region to be the cladding part 5 by a laser light patterning method. With respect to the irradiation amount of light, the relationship between the irradiation amount within the predetermined rate of irradiation amount of light and the refractive index of the optical material whose refractive index decreases with increases in irradiation amount of light within the predetermined range of irradiation amount of light is previously determined, and then such an irradiation amount of light which provides the refractive indexes of the core part 4 and the cladding part S for constituting the desired optical waveguide is determined.

The core part 4 and the cladding part 5 may be formed in such a manner that the regions on both sides of the region to be the core part 4 of the intermediate layer 3 is irradiated with a relatively large irradiation amount of light, to form the core part 4 and the cladding parts 5 housing the same having a refractive index smaller than that of the core part 4. That is, the part to be the core part 4 may be irradiated with light to such an extent that the desired refractive index is obtained, and the regions on both sides thereof to be the cladding part 5 may be irradiated with a larger amount of light than the irradiation amount applied to the core part 4. Alternatively, no irradiation with light may be conducted on the part to be the core part 4 as similar to the foregoing manner, but the regions on both sides thereof to be the cladding part 5 may be irradiated with a predetermined irradiation amount of light.

As shown in FIG. 1C, an upper cladding layer 6 is then formed on the layer, in which the core part 4 and the cladding part 5 are formed. As the upper cladding layer 6, a film having a refractive index smaller than that of the core part 4 and equivalent to the cladding part 5 may be formed. For example, when a resin material, such as a fluorine resin and a silomane polymer, is used, a preferred upper cladding layer 6 can be formed since the refractive index can be easily controlled, a film can be formed by an easy method such as a spin coating method, and the material has a good light transmission property. The upper cladding layer 6 is not always necessary, and the core part 4 and the cladding part 5 may be exposed to the air or vacuum.

In the optical waveguide formed in the foregoing manner, the refractive index and the thickness of the lower cladding layer 2, the height, the width and the refractive index of the core part 4, and the thickness and the refractive index of the upper cladding layer 6 may be appropriately determined by considering and designing based on the known theories of an optical waveguide.

As the optical material for forming the optical waveguide, whose refractive index varies corresponding to the irradiation with light having energy higher than that of the guided light and decreases with increases in irradiation amount of light within the predetermined range of irradiation amount of light, specifically, optical material may be used which has a tendency that the refractive index thereof decreases with increases it irradiation amount of light within the predetermined range of irradiation amount of light by the change in structure of the film material, such as decomposition or polymerization of the film material or formation of a color center caused by the irradiation with light. The film of the optical material can be formed by a spin coating method, a dip coating method, a spray coating method, a roller coating method and a vacuum deposition method.

As the light for controlling the refractive index of the optical material in the invention, which has an energy larger than that of the guided light, a visible ray or an ultraviolet ray is generally employed because a near infrared ray and an infrared ray are generally used as the guided light. The light having energy larger than that of the guided light may be light having high energy with a shorter wavelength than that of the guided light, and may be, for example, an X-ray. By using the light having higher energy with shorter wavelength, a chemical change necessary for causing the variation in refractive index is caused in the optical material. Thus, the refractive index of the optical material decreases by the irradiation with light within the predetermined range of irradiation amount of light, and then the irradiation with light is terminated at the desired refractive index to terminate the chemical change and to stabilize the optical material. As a result, the core part and/or the cladding part having the desired refractive indexes can be formed.

As described in the foregoing, because the light for controlling the refractive index of the optical material is of a higher energy than that of the guided light, upon transmitting the guided light through the core part of the optical waveguide formed of the optical material, the refractive index of the optical material is not varied by the guided light having lower energy than that of the light for controlling the refractive index. Accordingly, the optical waveguide has a stable refractive index, and thus it can be used as an optical waveguide having good characteristics.

The reason for using the optical material whose refractive index varies corresponding to the irradiation with light having energy higher than that of the guided light and decreases with increases in irradiation amount of light within the predetermined range of irradiation amount of light in the production process as one embodiment of the invention is as follows. The lower cladding layer 2 and the intermediate layer 3 formed on the lower cladding layer 2 are formed by using the similar optical material whose refractive index varies corresponding to the irradiation amount of light, and the core part 4 and the cladding part 5 are formed by making the difference in refractive index caused by the difference in irradiation amount of light to the intermediate layer 3. At this time, there is a possibility that the light for forming the core part 4 and the cladding part 5 is also incident on the lower cladding layer 2, to make the irradiation amount of light for the lower cladding layer 2 larger than the irradiation amount of light for the core part 4. When a material whose refractive index increases with increases in the irradiation amount of light is used as the optical material whose refractive index varies corresponding to the irradiation amount of light, the refractive index of the lower cladding layer 2 becomes larger than that of the core part 4 to cause interference of the function as an optical waveguide.

On the other hand, by using the optical material whose refractive index decreases with increases in irradiation amount of light, even when the irradiation amount of light for the lower cladding layer 2 becomes larger than the irradiation amount of light for the core part 4, the refractive index of the lower cladding layer 2 is smaller than that of the core part 4, which are suitable as an optical waveguide.

In another embodiment of the invention, a material whose refractive index increases with increases in irradiation amount of light may be used instead of the optical material used in the optical waveguide of the foregoing embodiment of the invention. In the case where such optical material is employed, the refractive index of the lower layer becomes larger than that of the upper layer because the light incident on the upper layer is also incident on the lower layer. Accordingly, before forming the intermediate layer as the upper layer to be the core part and the cladding part, the lower cladding layer as the lower layer is irradiated with light and then subjected to a heat treatment, so as to evaporate the optical polymerization promoter. Thus, the refractive index of the lower cladding layer is not varied by the irradiation with light for forming the core part and the cladding part on the lower cladding layer.

The optical material may be any optical material having a clear relationship between the irradiation amount of light and the refractive index corresponding to the irradiation amount of light, and is not necessarily optical material whose refractive index simply varies corresponding to the irradiation amount of light, i.e., decreases or increases with increases in irradiation amount of light. When the regions of the optical material layer to be the core part and the cladding part are irradiated with light in irradiation amounts of light for forming the desired refractive indexes by using the optical material having a clear relationship between the irradiation amount of light and the refractive index corresponding to the irradiation amount of light, the core part and the cladding part having the desired refractive indexes can be formed. In this case, when the optical polymerization promoter in the lower layer is evaporated by a heat treatment before forming the upper layer as described in the foregoing, the refractive index of the lower cladding layer can be prevented from being varied due to the irradiation with light for forming the core part and the cladding part of the upper layer.

Therefore, the same effects as the embodiment described in the foregoing can also be obtained in this embodiment of the invention.

In the foregoing embodiment and this embodiment of the invention, the optical waveguide has no unevenness on the surface of the lower cladding layer, the intermediate layer having the core part and the cladding part, and the upper cladding layer. Therefore, even in the case where a plurality of optical waveguides are accumulated in the vertical direction, no unevenness is formed on the respective waveguide, and thus the accuracy of the optical waveguide formed in the later step is not deteriorated by unevenness of the optical waveguide formed in the former step.

Figure 2A:
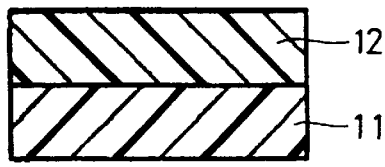
Figure 2B:
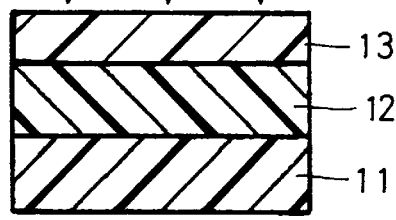
Figure 2C:
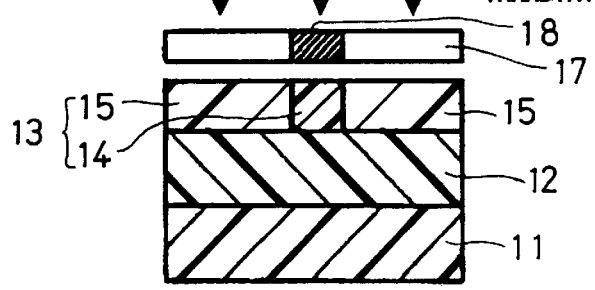
Figure 2D:
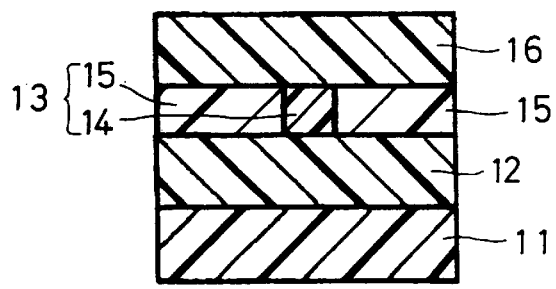

FIGS. 2A to 2D are cross sectional views showing steps of still another embodiment of the process for producing an optical waveguide of the invention. FIG. 2A is a cross sectional view showing the step of forming a lower cladding layer on a substrate. FIG. 2B is a cross sectional view showing the step of forming an intermediate layer. FIG. 2C is a cross sectional view showing the step of forming a core part and a cladding part in the intermediate layer. FIG. 2D is a cross sectional view showing the step of forming an upper cladding layer, as well as another embodiment of the optical waveguide of the invention.

In FIGS. 2A to 2D, an optical waveguide comprises a substrate 11, a lower cladding layer 12, and an intermediate layer 13 in which a core part 14 and cladding parts 15 of the optical waveguide are formed. The intermediate layer 13 is a layer of a siloxane polymer obtained by forming siloxane bonds by irradiation with light having energy higher than that of the guided light. The intermediate layer 13 also comprises optical material whose refractive index decreases with increases of the irradiation amount of light within the predetermined range of irradiation amount of light. A core part 14 is formed in the intermediate layer 13, and a cladding part 15 is formed by irradiating regions on both aides of the region to be the core part 14 of the intermediate layer 13 with a relatively larger amount of light than that of the region to be the core part 14, so as to make the refractive index smaller than that of the core part 14. The cladding portion of the optical waveguide is constituted by the lower cladding layer 12, the cladding parts 15 formed in the intermediate layer 13, and an upper cladding layer 16.

In the process for producing an optical waveguide of the embodiment of the invention, a lower cladding layer 12 is formed on a substrate 11 as shown in FIG. 2A.

As the substrate 11, similar to the substrate 1, various substrates used as a substrate handling an optical signal, such as an optical integrated circuit substrate and an optical and electronic mixed substrate, for example, a silicon substrate, an alumina substrate, a glass ceramics substrate, a multi-layer Ceramic substrate, a plastic electric wiring substrate and a polyimide substrate, may be used.

The lower cladding layer 12 may be formed in the following manner. A layer containing a siloxane polymer obtained by forming siloxane bonds by irradiation with light having energy higher than that of the guided light is formed on the substrate 11, and the layer thus formed is irradiated with light in a larger irradiation amount than that of the core part 14 which makes the refractive index of the lower cladding layer 12 smaller than that of the core part 14. The lower cladding layer 12 has a refractive index smaller than that of the core part 14, and may be formed of other material than the optical material.

As shown in FIG. 2B, the intermediate layer 13 containing a siloxane polymer obtained by forming siloxane bonds by irradiation with light having energy higher than that of the guided light is formed on the lower cladding layer 12. At this time, it is preferred that the whole of the intermediate layer 13 is irradiated with light in a predetermined irradiation amount of light to have a suitable refractive index as the core part 14.

As shown in FIG. 2C, by irradiating only regions on both sides of the region to be the core part 14 of the optical material layer, namely regions to be the cladding part 15, with a relatively larger amount of light within the predetermined range of irradiation amount of light in comparison with the core part 14 region, the refractive index of the cladding part 15 becomes smaller than that of the core part 14, to form the core part 14 and the cladding parts 15. In order to irradiate only the regions to be the cladding part 15 with the predetermined amount of light, the irradiation with light is conducted through a photomask 17 having a shielding part 18 used in the known photolithography process, or after shielding the part to be the core part 14 by forming an opening pattern comprising a metallic thin film formed directly on the intermediate layer 13. Alternatively, the irradiation with light 's directly conducted on the regions to be the cladding part 15 by a laser light patterning method.

As shown in FIG. 2D, an upper cladding layer 16 is then formed on the layer, in which the core part 14 and the cladding part 15 are formed. The upper cladding layer 16 may be formed as a film containing optical material having a refractive index smaller than that of the core part 14 but equivalent to the cladding part 15. The upper cladding layer 16 is not always necessary, and the core part 14 and the cladding parts 15 may be exposed to the air or vacuum.

The layer containing the siloxane polymer, in which siloxane bonds are formed by irradiation with light having energy higher than that of the guided light, used in the optical waveguide of the intention may be obtained in the following manner. A solution comprising a monomer or an oligomer comprising a silicon (Si) atom having attached thereto, as end groups, an OH group and an organic component, such as an alkyl group, e. g., a methyl group, and a phenyl group, a polymerization promoter of optical reaction type, and an organic solvent is prepared. The resulting solution for forming a film of the siloxane polymer is coated on the substrate to form a film. The film is irradiated with light to form siloxane bonds in the film through dehydration polymerization or alcohol eliminating polymerization. Thereafter, the film is subjected to a heat treatment to eliminate the solvent, the polymerization promoter and by-products, such as water and an alcohol, produced during the polymerization to the outside of the film, so as to obtain a film of the siloxane polymer having siloxane bonds as a main skeleton (hereinafter, simply referred to as "siloxane polymer film"). The layer can be formed by a spin coating method, a dip coating method, a spray coating method, a roller coating method and a vacuum deposition method.

As a result of earnest investigations made by the inventors on the siloxane polymer used in the invention, it has been found that the refractive index of the siloxane polymer film (layer) can be precisely controlled by changing the irradiation amount of light on the formation of the siloxane bonds.

Figure 3:
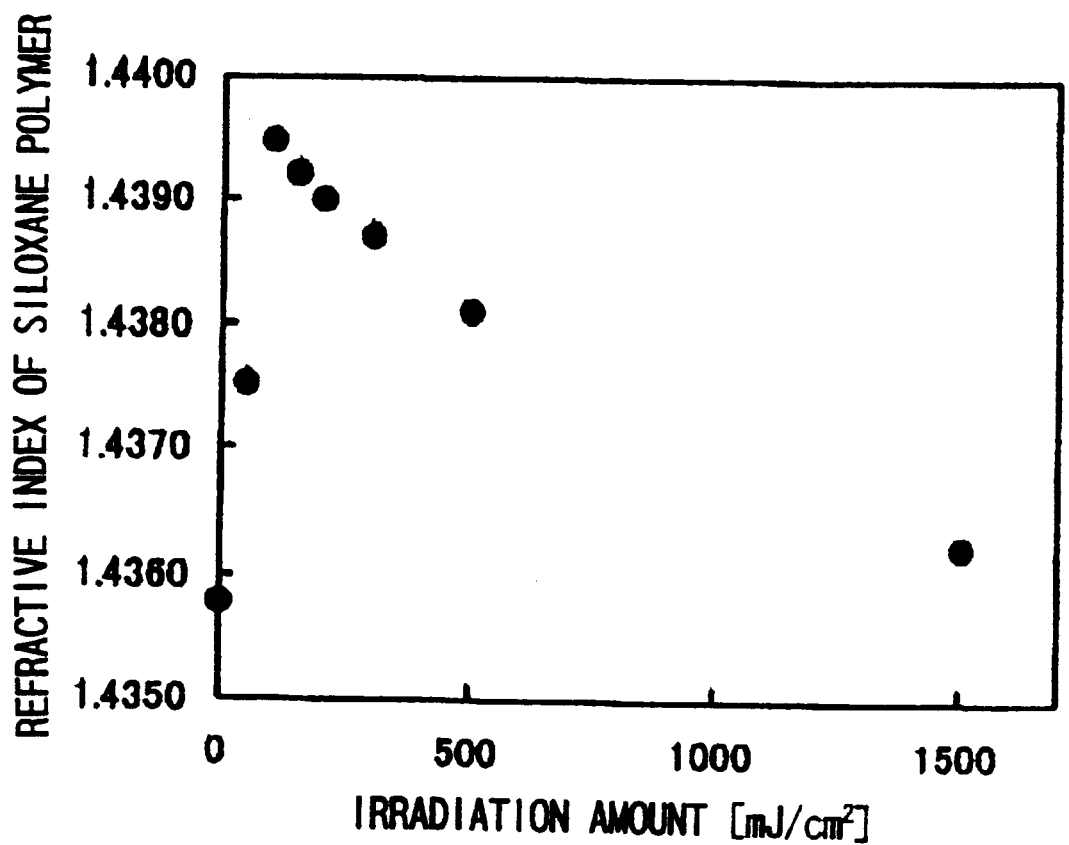
FIG. 3 is a diagram showing an example of the relationship between the irradiation amount of light and the refractive index of a siloxane polymer film in forming the film.

FIG. 3 is a diagram showing an example of the relationship between the irradiation amount of light on the formation of a siloxane polymer film and the refractive index.

In FIG. 3, the abscissa is the irradiation amount of light on forming the film (unit: $mJ/cm^2$), and the ordinate is the refractive index of the resulting siloxane polymer film. The dots in the figure indicate the measurement results. As the irradiation light used herein, an ultraviolet ray emitted from a high-pressure mercury lamp having an effective energy component for the polymerization promoter of optical reaction type is used as the light having energy higher than that of the guided light.

It is understood from FIG. 3 that when the irradiation amount of light on forming the film is increased, the formation of siloxane bonds is promoted in the initial stage of the irradiation with light to form firm siloxane bonds and to once quickly increase the refractive index of the siloxane polymer film to the predetermined value. The refractive index of the siloxane polymer film exhibits the maximum value at a certain irradiation amount of light corresponding to the characteristics of the material, such as the monomer or the oligomer used in the solution for forming the siloxane polymer film. Thereafter, the refractive index decreases with increases in irradiation amount of light, to the lowest value corresponding to the characteristics of the material. The reason of the phenomenon can be considered as follows.

When the irradiation amount of light is increased on forming the film, the formation of siloxane bonds is accelerated to form a firmer siloxane skeleton. When the firm siloxane skeleton is produced in a certain extent or more, the solvent and the polymerization promoter remaining in the siloxane polymer film, as well as the by-products, such as water and an alcohol, formed on the polymerization can be easily eliminated to the outside of the film by the heat treatment after the irradiation with light. At this time, because the elimination of the solvent and the like is conducted with the shape of the firm siloxane skeleton being maintained and substantially not shrunk, the density of the film decreases and the refractive index of the film decreases.

Because the shape of the firm siloxane skeleton is maintained at this time, and the skeleton is not shrunk, the film thickness is not decreased on forming the film, and the flatness of the surface of the film on coating the solution for forming the film is maintained after the formation of the film. Therefore, even when the underlying substrate has unevenness or roughness, excellent flatness and smoothness can be realized.

With respect to the irradiation amount of light on the region to be the core part 14 and the regions to be the Cladding part 15 on both sides of the core part 14 region in the intermediate layer 13, the relationship between the irradiation amount and the refractive index within the predetermined range of irradiation amount of light as shown in FIG. 3 with regard to the optical material used for the intermediate layer 13 is previously determined, and then such an irradiation amount of light which provides the refractive indexes of the core part 14 and cladding part 15 for constituting the desired optical waveguide is determined.

The irradiation amount of light on the region to be the ore part 14 is preferably such an irradiation amount of light that sufficient siloxane bonds are formed by irradiation with light, i.e., an irradiation amount is preferable which is larger than the irradiation amount where a maximum refractive index is obtained, as shown in FIG. 3. This is because by forming sufficient siloxane bonds in the core part 14 by sufficient irradiation light, the core part 14 contains a firm and stable siloxane polymer to possess the desired refractive index, and the weather resistance and heat stability of the film are also improved.

On the other hand, the regions to be the cladding part 15 are irradiated with a larger amount of light than that of the region to be the core part 14, in which larger amount of light a smaller refractive index is provided. By employing such a configuration, the refractive index of the cladding part 15 becomes smaller than that of the core part 14, and the structure comprising the cladding part 15 and the core part 14 can function as an optical waveguide.

In the case where the siloxane polymer whose refractive index decreases with increases in irradiation amount of light is used as optical material of the optical waveguide, when the siloxane polymer is used not only in the intermediate layer 13 having the core part 14 but also in the lower cladding layer 12, the refractive index of the lower cladding layer 12 can be maintained smaller than that of the core part 14 after the lower cladding layer 12 is formed, even though the irradiation light for forming the core part 14 and the cladding part 15 enters the lower cladding layer 12. The structure having the cladding parts 15 and core part 14 can function as an optical waveguide. Furthermore, when the lower cladding layer 12 is subjected to a heat treatment after the irradiation with light to evaporate the optical polymerization promoter before forming the intermediate layer 13 to be the core part 14 and the cladding part 15, so as to cancel the function of formation of siloxane bonds by irradiation with light, it is possible that the refractive index of the lower cladding layer 12 is not varied by the irradiation with light for forming the core part 14 and the cladding part 15 on the lower cladding layer 12.

In the process for producing an optical waveguide of the invention, a solution for forming a siloxane polymer film comprising a monomer or an oligomer comprising a silicon (Si) atom having attached thereto, as end groups, an OH group and an organic component, such as an alkyl group, e.g., a methyl group, and a phenyl group is used for forming the siloxane polymer film obtained by forming siloxane bonds by irradiation with light, as described in the foregoing. The monomer and oligomer may be a single kind or plural kinds. In the organic component, such as a methyl group and a phenyl group, attached as an end group, the H atom may be substituted with a halogen atom or a deuterium.

As an auxiliary effect of using the siloxane polymer, the optical waveguide using the siloxane polymer of the invention has excellent heat resistance owing to siloxane bonds in the main skeleton because the siloxane polymer obtained by forming siloxane bonds by irradiation with light is used in the core part 14 and cladding part 15 of the optical waveguide. Furthermore, because the optical waveguide of the invention has smaller content of a CH group in comparison with a polymer mainly comprising C and H, such as PMMA, polycarbonate, polyimide and BCB, the infrared vibration absorption of a CH group is small, so as to obtain an excellent light transmissibility in the near infrared ray region, to which the light used as the guided light belongs.

As described in the foregoing, in the process for producing an optical waveguide of the invention, the core part and cladding part of the optical waveguide are formed of optical material whose refractive index varies by irradiation with light having energy higher than that of the guided light and decreases or increases with increases in irradiation amount of light within the predetermined irradiation amount of light, and the core part and the cladding part are formed by making the refractive index of the cladding part smaller than that of the core part by irradiating the region to be the cladding part with a larger or smaller amount of light than that of the region to be the core part. Therefore, because dry etching or wet etching is not necessary for forming the core part, the complicated steps and the deterioration of the processed shape associated with the working of the core part using dry etching and wet etching can be eliminated, so as to produce an optical waveguide produced by a convenient process with high productivity and high processing accuracy.

The optical waveguide and the process for producing the same of the invention will be specifically described by examples with reference to FIGS. 2A to 2D.

EXAMPLE 1

A plurality of substrates 11 comprising silicon were prepared. Each of the substrate 11 was coated with a solution for forming a siloxane polymer film comprising a monomer comprising a silicon atom having an OH group, a methyl group and a phenyl group attached thereto as end groups, a polymerization promoter for optical polymerization, and an organic solvent by a spin coating method, and then subjected to heat treatment at 100° C. for 30 minutes to evaporate the organic solvent. Thereafter, the whole surfaces of the respective coated substrates 11 were irradiated with an ultraviolet ray emitted from a high-pressure mercury lamp in an irradiation amount of light of 1,500 mJ/cm², and thereafter subjected to a heat treatment at 150° C. for 60 minutes, to form a lower cladding layer 12 formed of a siloxane polymer film having a film thickness of 15 μm and a refractive index of 1.4367.

The solution for forming a siloxane polymer film used for forming the lower cladding layer 12 was coated on the lower cladding layer 12 by a spin coating method, and the organic solvent was evaporated by subjecting to a heat treatment at 100° C. for 30 minutes, so as to form an intermediate layer 13 composed of a siloxane polymer film for forming a sore part 14 and cladding parts 15. The thickness of the layer was 5 μm. Thereafter, the whole surface of the substrate 11 on which the intermediate layer 13 was formed, was irradiated with an ultraviolet ray emitted from a high-pressure mercury lamp at an irradiation amount of light of 100 mJ/cm².

Furthermore, a part to be the core part 14 of the intermediate layer 13 was shielded with the use of various photomasks having shielding parts in a stripe form having different widths set in the range of from 1 to 50 μm, and regions to be the cladding part 15 on both sides of the shielding part were irradiated with an ultraviolet ray emitted from a high-pressure mercury lamp at an irradiation amount of light of 1,500 mJ/cm² as a total with the irradiation amount of 100 mJ/cm² which had been previously made.

According to the manners described in the foregoing, a plurality of optical waveguides were produced, each of which comprises the lower cladding layer 12 having a refractive index of 1.4367 and a thickness of 15 μm, the core part 14 having a refractive index of 1.440, different widths in the range of from 1 to 50 μm and a height of 5 μm, and the cladding part 15 having a refractive index of 1.4367 formed in the intermediate layer 13 along with the core part 14, with an air layer as an upper cladding layer 16.

Laser light having a wavelength of 1.3 μm was incident on and transmitted through the plurality of optical waveguides, the emitted light was observed with an infrared ray camera. It was confirmed that the optical waveguides produced with a shielding width of 10 μm or less were in a single mode. The intensity of the emitted light was observed with a light power meter to evaluate the transmission loss. It was confirmed that the loss was about 0.2 dB/cm, and performance sufficient as an optical waveguide was exhibited.

EXAMPLE 2

Plural substrates 11 formed of silicon were prepared. The respective substrate 11 was coated with a solution for forming a siloxane polymer film comprising a monomer comprising a silicon atom having an OH group, a methyl group and a phenyl group attached thereto as end groups, a polymerization promoter for optical polymerization, and an organic solvent by a spin coating method, and then subjected to heat treatment at 100° C. for 30 minutes to evaporate the organic solvent. Thereafter, the whole surfaces of the plurality of coated substrates were irradiated with an ultraviolet ray emitted from a high-pressure mercury lamp in an irradiation amount of light of 1,500 mJ/cm², and a heat treatment was conducted at 150° C. for 60 minutes, to form a lower cladding layer 12 composed of a siloxane polymer film having a film thickness of 15 μm and a refractive index of 1.4367.

The solution for forming a siloxane polymer film used for forming the lower cladding layer 12 was coated on the lower cladding layer 12 by a spin coating method, and the organic solvent was evaporated by subjecting to a heat treatment at 100° C. for 30 minutes, so as to form an intermediate layer 13 composed of a siloxane polymer film for forming a core part 14 and cladding parts 15. The thickness of the intermediate layer 13 was 8 μm. Thereafter, the whole surface of the respective substrate 11, on which the intermediate layer 13 was formed, was irradiated with an ultraviolet ray emitted from a high-pressure mercury lamp at an irradiation amount of light of 100 mJ/cm².

Furthermore, regions to be the core part 14 of the respective intermediate layers 13 were shielded with the use of various photomasks having shielding parts in a stripe form having different widths set in the range of from 1 to 50 μm, and regions to be the cladding part 15 on both sides of the shielding parts of the respective intermediate layers were irradiated with an ultraviolet ray emitted from a high-pressure mercury lamp at an irradiation amount of light of 1,500 mJ/cm² as a total with the irradiation amount of 100 mJ/cm² which had been previously made, followed by subjecting to a heat treatment at 150° C. for 60 minutes.

The solution for forming a siloxane polymer film used for forming the lower cladding layer 12 was coated on the intermediate layer 13, in which the core part 14 and cladding parts 15 were formed, by a spin coating method, and a heat treatment was conducted at 100° C. for 30 minutes and at 150° for 60 minutes without irradiation with light, so as to form an upper cladding layer 16 composed of a siloxane polymer film having a refractive index of 1.4360 and a thickness of 15 μm.

According to the manners described in the foregoing, a plurality of optical waveguides were produced, which comprise the lower cladding layer 12 having a refractive index of 1.4367 and a thickness of 15 μm, the intermediate layer 13 disposed on the lower cladding layer 12, in which the core part 14 having a refractive index of 1.440, different widths in the range of from 1 to 50 μm and a height of 8 μm, and the cladding part 15 having a refractive index of 1.4367 were formed, and the upper cladding layer 16 of the siloxane polymer film having a refractive index of 1.4360 and a thickness of 15 μm which was not subjected to irradiation with light.

Laser light having a wavelength of 1.3 μm was let in and transmitted through the plurality of optical waveguides, the emitted light was observed with an infrared ray camera. It was confirmed that the optical waveguides produced with a shielding width of 10 μm or less were in a single mode. The intensity of the emitted light was observed with a light power meter to evaluate the transmission loss. It was confirmed that the loss was about 0.4 dB/cm, and performance sufficient as an optical waveguide was exhibited.

EXAMPLE 3

Plural substrates 11 formed of silicon were prepared. The respective substrate 11 was coated with a solution for forming a siloxane polymer film comprising a monomer comprising a silicon atom having an OH group, a methyl group and a phenyl group attached thereto as end groups, a polymerization promoter for optical polymerization, and an organic solvent by a spin coating method, and then subjected to heat treatment at 100° C. for 30 minutes to evaporate the organic solvent. Thereafter, the whole surfaces of the plurality of coated substrates were irradiated with an ultraviolet ray emitted from a high-pressure mercury lamp in an irradiation amount of light of 1,500 mJ/cm², and a heat treatment was conducted at 150° C. for 60 minutes, to form a lower cladding layer 12 composed of a siloxane polymer film having a film thickness of 15 μm and a refractive index of 1.4367.

The solution for forming a siloxane polymer film used for forming the lower cladding layer 12 was coated on the lower cladding layer 12 by a spin coating method, and the organic solvent was evaporated by subjecting to a heat treatment at 100° C. for 30 minutes, so as to form an intermediate layer 13 composed of a siloxane polymer film for forming a core part 14 and cladding parts 15. The thickness of the intermediate layer 13 was 6 μm. Thereafter, the whole surface of the respective substrate 11, on which the intermediate layer 13 was formed, was irradiated with an ultraviolet ray emitted from a high-pressure mercury lamp at an irradiation amount of light of 100 mJ/cm$^2$.

Furthermore, regions to be the core part 14 of the respective intermediate layers 13 were shielded with the use of various photomasks having shielding parts in a stripe form having different widths set in the range of from 1 to 50 μm, and regions to be the cladding part 15 on both sides of the shielding part of each of the intermediate layers were irradiated with an ultraviolet ray emitted from a high-pressure mercury lamp at an irradiation amount of light of 1,500 mJ/cm$^2$, followed by subjecting to a heat treatment at 150° C. for 60 minutes.

A solution obtained by dissolving a cyclized polyethylene fluoride resin in a fluorine series organic solvent was coated on the intermediate layer 13, in which the core part 14 and cladding parts 15 were formed, by a spin coating method, and a heat treatment was conducted at 150° C. for 60 minutes to evaporate the organic solvent, so as to form an upper cladding layer 16 having a refractive index of 1.330 and a thickness of 15 μm.

According to the manners described in the foregoing, a plurality of optical waveguides were produced, which comprise the lower cladding layer 12 having a refractive index of 1.4367 and a thickness of 15 μm, the intermediate layer 13 disposed on the lower cladding layer 12, in which the core part 14 having a refractive index of 1.440, different width; in the range of from 1 to 50 μm and a height of 6 μm, and the cladding part 15 having a refractive index of 1.4367 were formed, and the upper cladding layer 16 of the cyclized polyethylene fluoride resin having a refractive index of 1.330 and a thickness of 15 μm.

Laser light having a wavelength of 1.3 μm was incident on and transmitted through the plurality of optical waveguides, the emitted light was observed with an infrared ray camera. It was confirmed that the optical waveguides produced with a shielding width of 10 μm or less were in a single mode. The intensity of the emitted light was observed with a light power meter to evaluate the transmission loss. It was confirmed that the loss was about 0.2 dB/am, and performance sufficient as an optical waveguide was exhibited.

As described in the foregoing, it has been confirmed that according to the invention, an organic optical waveguide having good characteristics can be produced by an easy process with high productivity and high processing accuracy.

The invention is not construed as being limited to the embodiments, and there is no restriction to make various variations and improvements therein without deviating from the gist of the invention. For example, as the optical material for forming the core part and the cladding part housing the core part, optical material, the refractive index of which can be controlled not only by an ultraviolet ray and a visible ray, but also by an X-ray, may be used.

As described in the foregoing, an optical waveguide which can be produced by an easy process with high productivity and high processing accuracy, and a process for producing an optical waveguide can be provided according to the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all variations which come within the meaning and the range of equivalency of the claims are therefore intended to be embraced therein.

What is claimed is:

1. An optical waveguide comprising:
   a core part formed by irradiation of an optical material whose refractive index varies according to an irradiation amount of light having energy higher than that of light to be transmitted;
   a cladding part disposed so as to cover at least part of an outer periphery of the core part in a direction of transmission of light, the cladding part being formed by irradiation of the optical material, the cladding part having a refractive index lower than a refractive index of the core part; and
   wherein the irradiation amount of light used to form the core part is less than the irradiation amount of light used to form the cladding part,
   wherein the refractive index of the optical material of the core part and cladding part increases with increasing amounts of irradiation with the light having higher energy over a first predetermined range of irradiation amount of light, the refractive index reaching a maximum at a defined irradiation amount of light; and
   wherein the refractive index of the optical material of the core part and cladding part decreases with increasing amounts of irradiation with the light having higher energy over a second predetermined range of irradiation amount of light.

2. The optical waveguide of claim 1, wherein the optical material is a material which is converted to a siloxane polymer having siloxane bonds by irradiating the optical material with the light having higher energy.

3. The optical waveguide of claim 1, wherein a lower limit of the second predetermined range of irradiation amount of light is equal to or more than such an irradiation amount that the refractive index of the optical material becomes the maximum.

4. The optical waveguide of claim 2, wherein the light having higher energy is an ultraviolet ray.

5. A process for producing an optical waveguide comprising:
   a step of forming a layer of an optical material whose refractive index varies corresponding to the irradiation amount of light having energy higher than that of light to be transmitted; and
   a step of irradiating a region to be a core part with the light having higher energy m a first irradiation amount and irradiating a region to be a cladding part covering at least part of an outer periphery of the core part in a direction of transmission of light with the light having higher energy in a second irradiation amount, wherein the first irradiation amount and second irradiation amount are different, so that the cladding part has a refractive index lower than a refractive index of the core part, wherein in the step of forming the layer, wherein the refractive index of the optical material of the core part and cladding part increases with increasing amounts of irradiation with the light having higher energy over a first predetermined range of irradiation amount of light, the refractive index reaching a maximum at a defined irradiation amount of light; and wherein the refractive index of the optical material of the core part and cladding part decreases with increasing amounts of irradiation with the light having higher energy over a second predetermined range of irradiation amount of light, and in the step of forming the core part and the cladding part, the region to be the cladding is irradiated with the light having higher energy in an irradiation amount relatively larger than that of a region to be the core part within the predetermined irradiation amount of light, to make the refractive index of the cadding lower than that of the core part.

6. The process for producing an optical waveguide of claim 5, wherein in the step of forming the layer, the optical material is a material which is converted to a siloxane polymer having siloxane bonds by irradiation with the light having higher energy.

7. The process for producing an optical waveguide of claim 5, wherein in the step of forming the layer, a lower limit of the second predetermined range of irradiation amount of light is equal to or higher than such an irradiation amount that the refractive index of the optical material becomes the maximum with respect to the irradiation with the light having higher energy.

8. The process for producing an optical waveguide of claim 6, wherein the siloxane bonds are formed by irradiation with an ultraviolet ray.

* * * * *